(12) United States Patent
Brunckhorst et al.

(10) Patent No.: US 10,214,401 B2
(45) Date of Patent: Feb. 26, 2019

(54) MODULAR POWERED MOVER ATTACHMENT

(71) Applicant: THE BOEING COMPANY, Chicago, IL (US)

(72) Inventors: Christian A. Brunckhorst, Woodinville, WA (US); Nicholas J. Brimlow, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 76 days.

(21) Appl. No.: 15/259,815

(22) Filed: Sep. 8, 2016

(65) Prior Publication Data

US 2017/0158476 A1  Jun. 8, 2017

Related U.S. Application Data

(60) Provisional application No. 62/262,847, filed on Dec. 3, 2015.

(51) Int. Cl.
| | | |
|---|---|---|
| *B66F 9/075* | (2006.01) | |
| *B66F 9/18* | (2006.01) | |
| *B62B 5/00* | (2006.01) | |
| *B62B 3/06* | (2006.01) | |

(52) U.S. Cl.
CPC ........ *B66F 9/07504* (2013.01); *B62B 3/0612* (2013.01); *B62B 5/0079* (2013.01); *B66F 9/18* (2013.01); *B62B 2202/10* (2013.01); *B62B 2203/21* (2013.01); *B62B 2207/04* (2013.01)

(58) Field of Classification Search
CPC .............. B62B 5/0079; B62B 2202/10; B62B 2203/21; B62B 2207/04; B66F 9/07504

USPC .................................. 187/237; 414/607, 785
See application file for complete search history.

(56) References Cited

U.S. PATENT DOCUMENTS

| | | | | | |
|---|---|---|---|---|---|
| 2,772,918 | A | * | 12/1956 | Klinger ...................... | B60P 1/08 280/492 |
| 2,809,759 | A | * | 10/1957 | Manker .................... | B60D 1/14 280/416.1 |
| 3,258,146 | A | * | 6/1966 | Hamilton .................. | B66F 9/12 414/427 |
| 3,881,619 | A | * | 5/1975 | Morris ............... | B62D 53/0828 188/67 |

(Continued)

FOREIGN PATENT DOCUMENTS

| | | |
|---|---|---|
| DE | 3107785 A1 | 9/1982 |
| GB | 2522306 A | 7/2015 |
| JP | 2000351596 A | 12/2000 |

OTHER PUBLICATIONS

Extended European Search Report for Application No. 16199362.1-1731 dated Apr. 26, 2017.

*Primary Examiner* — James Keenan
(74) *Attorney, Agent, or Firm* — Patterson + Sheridan, LLP (57) ABSTRACT

Apparatus for moving different movable loads. The apparatus includes channels that can be engaged by a fork lift, pallet jack, or other powered mover. The apparatus also includes a mounting plate disposed between the channels. The mounting plate includes a receiver channel. The apparatus includes a plurality of load support tools that can selectively engage the receiver channel. The load support tools include different respective end effectors. A load can be engaged with the end effector of a selected load support tool such that the apparatus can move the load.

17 Claims, 11 Drawing Sheets

(56) References Cited

U.S. PATENT DOCUMENTS

| | | | | |
|---|---|---|---|---|
| 4,111,452 A * | 9/1978 | Carlsson | ............... | B60D 1/62 |
| | | | | 280/421 |
| 4,287,966 A * | 9/1981 | Frees | ............... | B66F 9/07504 |
| | | | | 180/14.1 |
| 5,096,365 A * | 3/1992 | Ford | ............... | B66F 9/18 |
| | | | | 414/607 |
| 5,100,283 A * | 3/1992 | Carty | ............... | B66C 23/48 |
| | | | | 187/240 |
| 5,236,299 A * | 8/1993 | Oskam | ............... | B66F 9/18 |
| | | | | 414/608 |
| 5,692,583 A * | 12/1997 | Reed | ............... | B66F 9/12 |
| | | | | 187/237 |
| 6,135,701 A * | 10/2000 | Galloway, Sr. | ............... | B66F 9/18 |
| | | | | 280/415.1 |
| 8,505,691 B2 * | 8/2013 | Smeeton | ............... | B66F 9/07504 |
| | | | | 187/222 |
| 8,864,164 B2 * | 10/2014 | Weiss | ............... | B66F 9/07504 |
| | | | | 280/415.1 |
| 2003/0034483 A1 | 2/2003 | Anderson | | |
| 2010/0189536 A1 | 7/2010 | Morgan et al. | | |
| 2014/0341688 A1 * | 11/2014 | Fox | ............... | B66F 9/07504 |
| | | | | 414/607 |

\* cited by examiner

MODULAR POWERED MOVER ATTACHMENT

This application is a U.S. non-provisional patent application that claims the benefit of U.S. provisional patent application Ser. No. 62/262,847, filed Dec. 3, 2015. The aforementioned related patent application is incorporated herein by reference in its entirety.

BACKGROUND

Aspects described herein relate to a load mover, and more specifically, to a load mover for use with a powered vehicle, such as a forklift or pallet jack, with interchangeable load support tools with different end effectors for engaging different types of loads.

SUMMARY

According to one aspect, an apparatus for moving a load includes a pair of channels arranged in a spaced apart manner and arranged to receive forks of a powered mover. The apparatus also includes a mounting plate disposed between the channels. The apparatus also includes a receiver channel mounted to the mounting plate. The apparatus also includes a plurality of load support tools, wherein each load support tool includes an adaptor configured to be interchangeably inserted in the receiver channel, wherein each of the plurality of load support tools includes a different end effector for engaging a different load.

According to one aspect, a mover includes a chassis and two load lifting forks extending in a substantially horizontal direction from the chassis. Each of the two load lifting forks include a wheel toward a distal end of the fork. The forks can be selectively raised and lowered relative to the chassis and the wheels. The mover also includes a mover platform that includes a pair of channels arranged over the load lifting forks. The mover platform also includes a mounting plate disposed between the channels. The mover platform also includes a receiver channel mounted to the mounting plate. The mover platform also includes a plurality of load support tools. Each load support tool includes an adaptor configured to be interchangeably inserted in the receiver channel. Each of the plurality of load support tools includes a different end effector for engaging a different load.

According to one aspect, a load moving apparatus includes a steerable chassis and a mover platform extending from the chassis. The mover platform includes a mounting plate extending from the chassis. The mover platform also includes a receiver channel mounted to the mounting plate. The mover platform also includes a plurality of load support tools, wherein each load support tool includes an adaptor configured to be interchangably inserted in the receiver channel, wherein each of the plurality of load support tools includes a different end effector for engaging a different load.

According to one aspect, an apparatus for moving a load includes a pair of channels arranged in a spaced apart manner and arranged to receive forks of a powered mover. The apparatus also includes a mounting plate disposed between the channels. The apparatus also includes a load support tool mounted to the mounting plate. The load support tool includes a rectangular platform with vertical walls extending from two opposing sides of the rectangular platform. The rectangular platform is configured to engage a bottom surface of a frame member of a load, wherein the vertical walls engage side surfaces of the frame member. The load support tool includes a pivot, and wherein the rectangular platform and vertical walls can rotate about the pivot.

According to one aspect, a method of moving a load includes attaching a mover platform to a powered mover. The method also includes selecting a load support tool from among a plurality of load support tools. Each load support tool includes an adaptor configured to be interchangeably inserted in a receiver of the mover platform. Each of the plurality of load support tools includes a different end effector for engaging different loads. The selected load support tool includes an end effector for engaging a target load. The method also includes engaging the selected load support tool in the receiver of the mover platform. The method also includes positioning the powered mover and mover platform such that the end effector of the selected load support tool is aligned for engagement with the target load. The method also includes raising the mover platform, using the powered mover, to engage the end effector with the target load. The method also includes moving the powered mover and mover platform to move the target load.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In various work environments, such as a manufacturing floor for commercial aircraft, equipment such as air stairs, movable work platforms, and ground support equipment must be moved around. For example, commercial aircraft are often constructed in an assembly-line manner in which an aircraft moves from station to station with certain assembly tasks performed at each station. When an aircraft is to be moved to a particular station, construction equipment, such as work platforms and air stairs, are moved out of the way to provide room for the moving aircraft and then moved back into place after the aircraft is positioned at the station. For larger pieces of construction equipment which can weigh several thousand pounds, four, five, six, or more workers may be needed to move and position construction equipment. In such circumstances, it could be possible for the construction equipment to be mistakenly bumped into the aircraft and potentially cause damage. Additionally, in such circumstances, the workers could become fatigued from pushing Aspects described herein include a mover platform with a receiver that can engage different load support tools, wherein each load support tool has a different end effector for engaging different equipment. The load support tools can be exchanged in the receiver such that the mover platform can handle a variety of different equipment. The mover platform can be integral with or attached to a powered moving device, such as a forklift or a powered pallet jack, which can provide sufficient power to move the large equipment engaged by the mover platform and selected load support tool. As a result, workers will not have to push the equipment around and the equipment may be precisely positioned by the powered moving device.

FIGS. 1A-1E illustrate a mover platform 100 according to one aspect that includes a pair of channels 102 that can engage forks of a forklift or pallet jack, such as the pallet jack 200 illustrated in FIGS. 3A-3B, described in greater detail below. A mounting plate 112 is arranged between the channels 102. In various aspects, the channels 102 include brackets 108 with fastener holes or slots 110. As discussed in greater detail below with reference to FIG. 3A and FIGS. 5-7, fasteners can pass through the slots 110 to engage fastener holes in the pallet jack 200 or the fork lift. In various aspects, the pair of channels 102 include holes 106 through a top portion of the channels 102. Fasteners can pass through the holes 106 to engage fastener holes in forks of the pallet jack 200 or the forklift. In various aspects, an interior top surface 104 of the pair of channels 102 could be covered with a rubber material or other tractive surface to prevent, minimize, or reduce slipping of the channels 102 relative to forks of the pallet jack 200 or the forklift.

A receiver channel 114 is mounted to the mounting plate 112 in a substantially horizontal orientation, meaning that a longitudinal axis of the receiver channel 114 is substantially horizontal. FIGS. 1A-1E illustrate the mover platform 100 with a first load support tool 120 is engaged with the receiver channel 114. The mover platform 100 also includes first and second storage channels 116 and 118 that can hold additional load support tools. FIGS. 1A-1E illustrate a second load support tool 160 engaged in the first storage channel 116 and a third load support tool 180 engaged in the second storage channel 118. In various aspects, the second storage channel 116 and the third storage channel 118 are arranged in a substantially vertical orientation, meaning that longitudinal axes of the storage channels 116 and 118 are substantially vertical. Such a substantially vertical orientation could be advantageous because gravity would reduce the likelihood that the load support tools stored in the storage channels 116 and 118 would fall out. The storage channels 116 and 118 can include respective plungers 117 and 119 that can engage holes in posts of load support tools to further retain the load support tools.

Figure 1A:
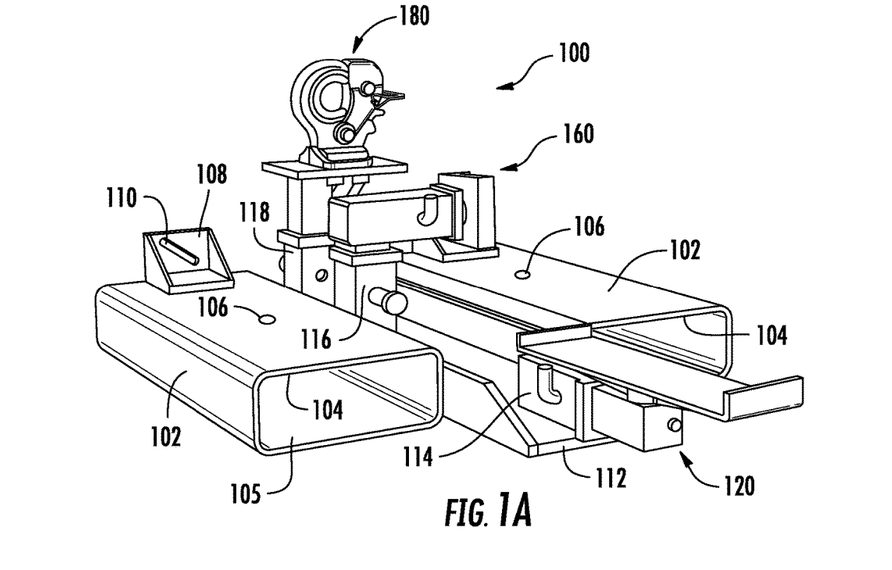
FIG. 1A is a perspective view of a mover platform, according to at least one aspect, for use with a forklift or pallet jack, wherein the mover platform includes a receiver channel and a plurality of storage receivers that engage different load support tools with different end effectors, and wherein a first load support tool is engaged with the receiver channel.
Figure 1B:
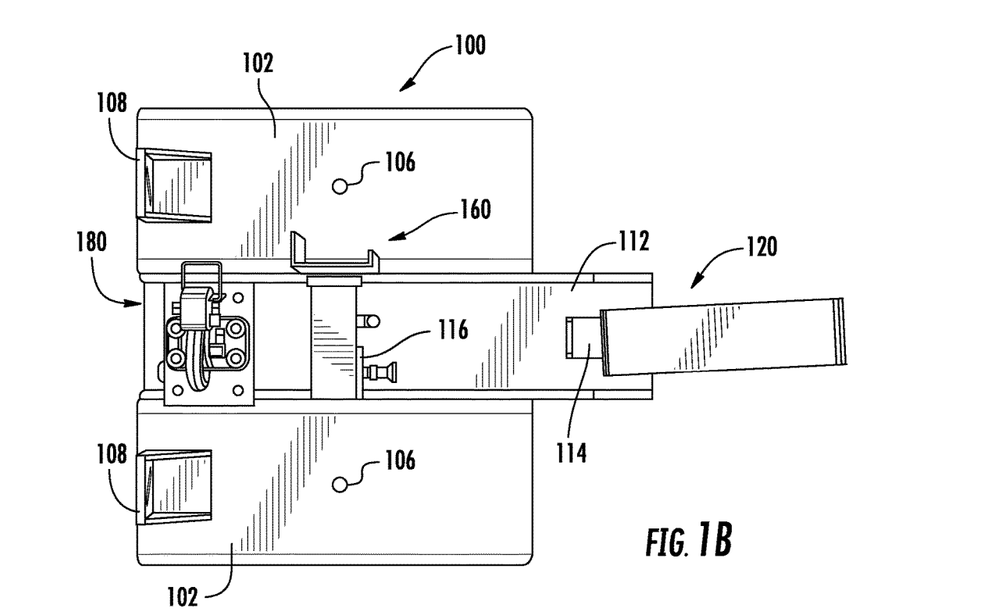
FIG. 1B is a top view of the mover platform FIG. 1A.
Figure 1C:
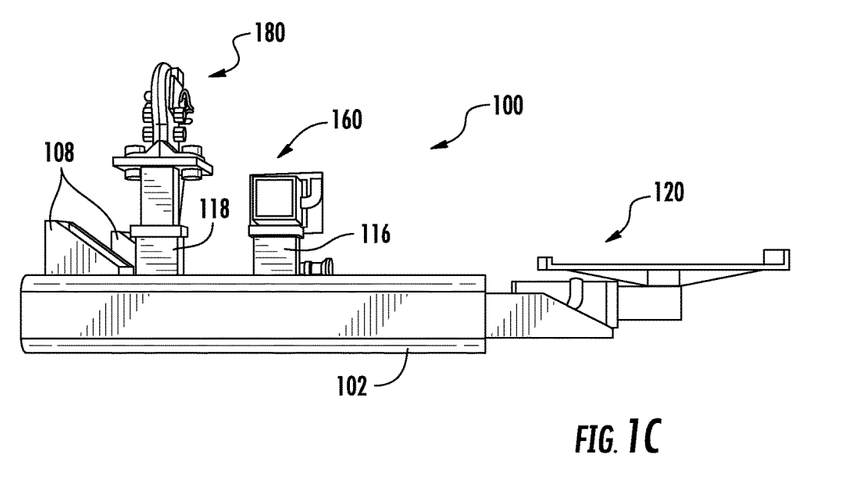
FIG. 1C is a side view of the mover platform of FIG. 1A.
Figure 1D:
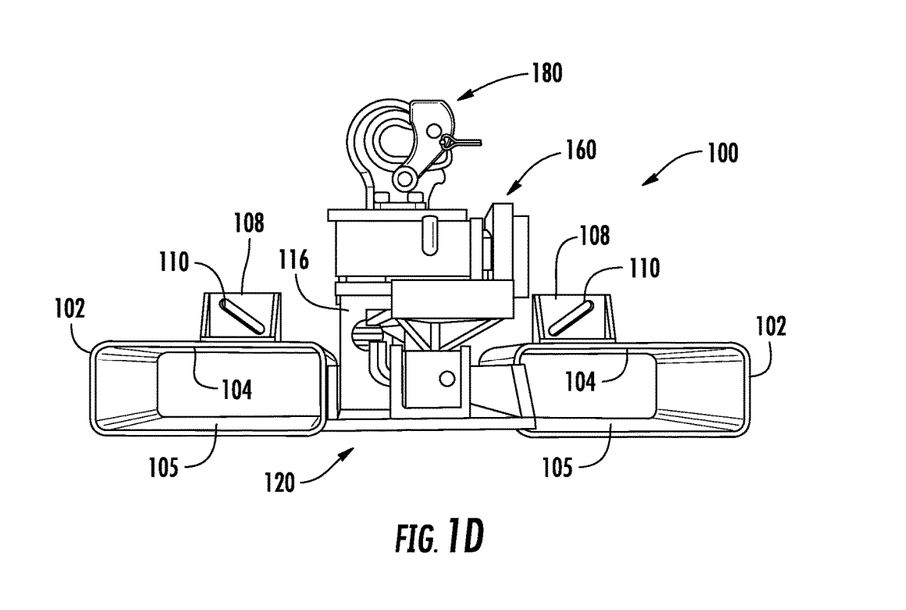
FIG. 1D is a front view of the mover platform of FIG. 1A.
Figure 1E:
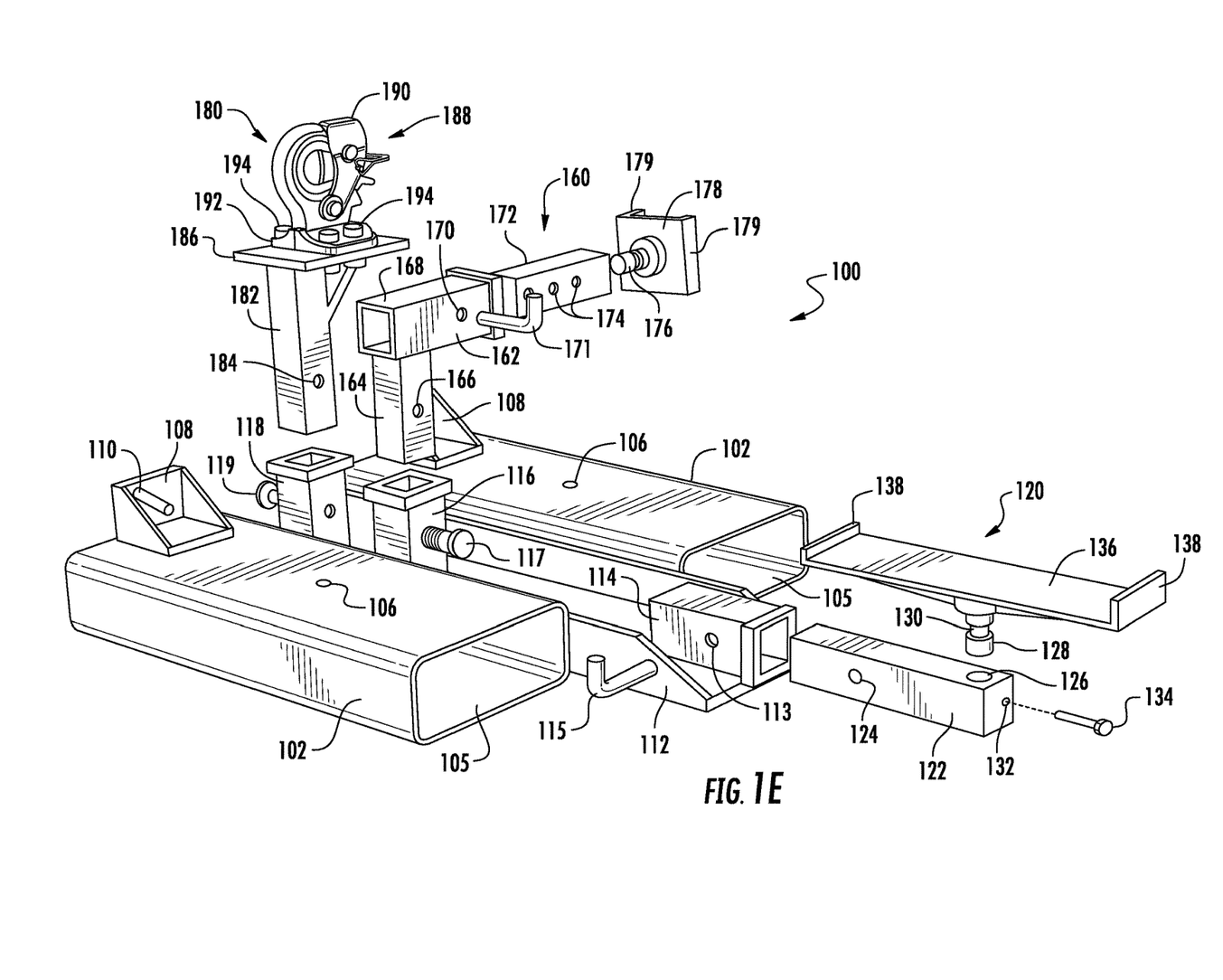
FIG. 1E is a perspective exploded view of the mover platform FIG. 1A.

FIG. 1E illustrates the first load support tool 120, the second load support tool 160, and the third load support tool 180 in an exploded view. The first load support tool includes an end effector that has a first rectangular platform 136 with vertical walls 138 extending from the first rectangular platform 136. In various aspects, the vertical walls 138 have the same height. In various other aspects, the vertical walls 138 have different heights. The first load support tool 120 includes an adaptor post 122 that engages the receiver channel 114 (or the respective storage channels 116 and 118). As illustrated, the adaptor post 122 slides into the receiver channel 114. The adaptor post 122 includes a hole 124 that can align with a hole 113 in the receiver channel 114 (or holes in the storage channels 116 and 118). A pin 115 can be inserted through the holes 113 and 124 in the receiver channel 114 and the adaptor post 122, respectively, to temporarily affix the adaptor post 122 in the receiver channel 114. The pin 115 could be held in place with a retainer clip or like device. A plunger, such as the plungers 117 and 119 in the respective storage channels 116 and 118, could also engage the hole 124 in the adaptor post 122. The adaptor post 122 also includes a cylindrical port 126 that accommodates a pivot 128 attached to the first rectangular platform 136. The pivot 128 engages the cylindrical port 126 such that the first rectangular platform 136 can rotate about the pivot 128. The pivot 128 includes a circumferential groove 130. The adaptor post 122 includes a hole 132 that can receive a fastener 134, such as a threaded fastener. When the fastener 134 is engaged in the hole 132, an end of the fastener 134 extends into the cylindrical port 126 and engages the circumferential groove 130 of the pivot 128, thereby preventing the pivot 128 from separating from the adaptor post 122.

FIG. 1E also illustrates in an exploded view of the second load support tool 160 engaged with the first storage channel 116. The second load support tool 160 includes an end effector having a second rectangular platform 178 with vertical walls 179 extending from the first rectangular platform 178. In various aspects, the vertical walls 179 have the same height. In various other aspects, the vertical walls 179 have different heights. The dimensions of sides of the second rectangular platform and/or the height(s) of the vertical walls 179 of the second end effector are different from the dimensions of the sides of the rectangular platform 136 and/or the height(s) of the vertical walls 138 of the first end effector 120. The second load support tool 160 includes an L-bracket post 162. The L-bracket post 162 includes an adaptor post portion 164 that engages the receiver channel 114 or one of the respective storage receivers 116 and 118. As illustrated in FIG. 1E, the adaptor post portion 164 slides into the first storage channel 116. The adaptor post portion 164 includes a hole 166 that can align with the plunger 117 in the first storage channel 116 to temporarily affix the adaptor post 122 in the receiver channel 114. The L-bracket post 162 also includes a receiver portion 168 configured as a receiver channel. The receiver portion 168 accommodates a pivot post 172 for the second load support tool 160. The pivot post 172 includes a plurality of holes 174 there through. When the pivot post 172 is engaged in the receiver portion 168 of the L-bracket 162, one of the holes 174 in the pivot post 172 can be aligned with a hole 170 in the receiver portion 168. A pin 171 or other fastener can be inserted through the hole 170 in the receiver portion 168 and the aligned hole 174 in the pivot post 172 to temporarily affix the pivot post relative to the receiver portion 168. As discussed in greater detail below with reference to FIG. 2B, an operator can change a distance of the second rectangular platform 178 from the receiver portion 168 of the L-bracket 162 by selectively aligning different ones of the holes 174 through the pivot post 172 with the hole 170 in the receiver portion 168. Similar to the first load support tool 120, the second rectangular platform includes a pivot 176 that can engage a cylindrical port in the pivot post 172 such that the second rectangular platform 178 can rotate about the pivot 176.

FIG. 1E also illustrates in an exploded view the third storage tool 180 engaged with the second storage channel 118. The third load support tool 180 includes an end effector that has a pintle hitch 188. The pintle hitch 188 includes a pintle hook 190 that can engage a lunette ring of ground support equipment, for example. The third load support tool 180 includes an adaptor post 182 that engages the second storage channel 118 (or the first storage channel 116 or the receiver channel 114). The adaptor post 182 includes a hole 184 that can align with the plunger 119 in the second storage channel 118. When the adaptor post 182 is engaged in the second storage channel 118, the plunger 119 can pass through the hole 184 in the adaptor post 182 to temporarily secure the adaptor post 182 in the second storage channel 118. The third load support tool 118 includes a universal plate 186 arranged at an end of the adaptor post 182. As shown in greater detail in FIG. 2A, the universal plate 186 includes an array of fastener holes 187 therethrough. The pintle hitch 188 includes a base 192 with a plurality of fastener holes. Fasteners, such as bolts 194, can be inserted through the plurality of fastener holes in the base 192 and through selected fastener holes 187 in the universal plate 186 to position the pintle hitch 188 on the universal plate 186 in one of several possible positions.

The first and second storage channels 116 and 118, respectively, are optional features. In various aspects, load support tools that are not being used (e.g., not engaged in the receiver channel 114) could be stored at a location away from the mover platform 100. However, including storage channels on the mover platform 100 for at least some of the load support tools can be advantageous in certain circumstances. For example, storing the load support tools on the mover platform 100 provides for ready access to the load support tools and relatively fast interchangeability between the load support tools. Additionally, environments in which foreign object debris concerns exist, such as an aircraft manufacturing or maintenance facility, storing the load support tools in storage channels 116 and 118 of the mover platform 100 can provide ready visual confirmation that no load support tools were left on the ground and/or in an aircraft. For example, if a storage channel 116 or 118 on the mover platform 100 is empty, then workers know to look for a missing load support tool.

Figure 2A:
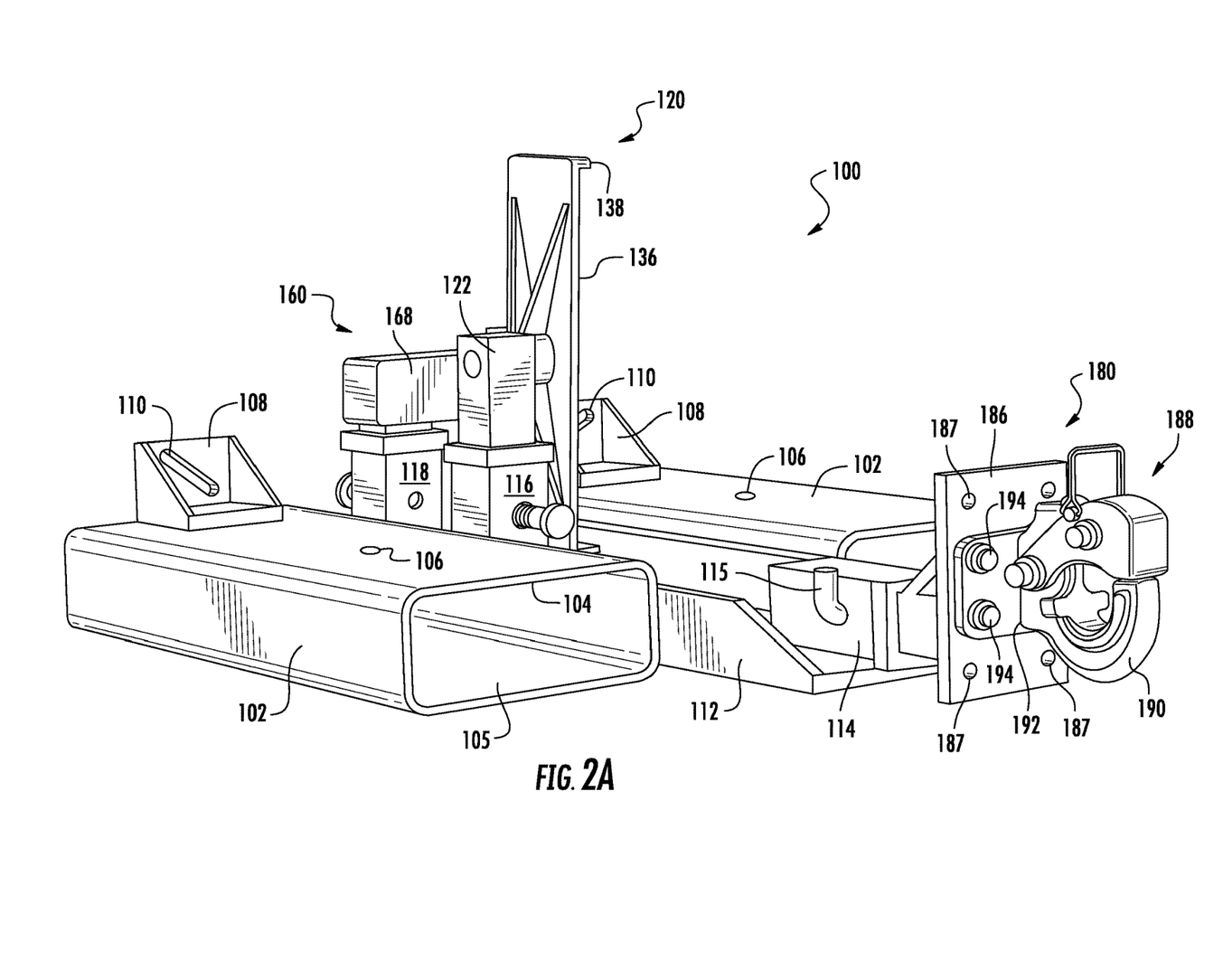
FIG. 2A is a perspective view of the mover platform of FIG. 1A with a second load support tool engaged with the receiver channel.

Referring now to FIG. 2A, the mover platform 100 is shown with the third load support tool 180 engaged in the receiver channel 114 and secured with the pin 115. FIG. 2A shows the first load support tool 120 engaged in the first storage channel 116 and the second load support tool 160 engaged in the second storage channel 118. FIG. 2A illustrates the universal plate 186 of the third load support tool 180 with the plurality of fastener holes 187 arranged in a vertical pattern. As discussed above, selectively inserting the fasteners 194 through certain fastener holes 187 in the universal plate 186 can result in changing a height position of the pintle hitch 188 relative to the receiver 114 and the mounting plate 112.

Figure 2B:
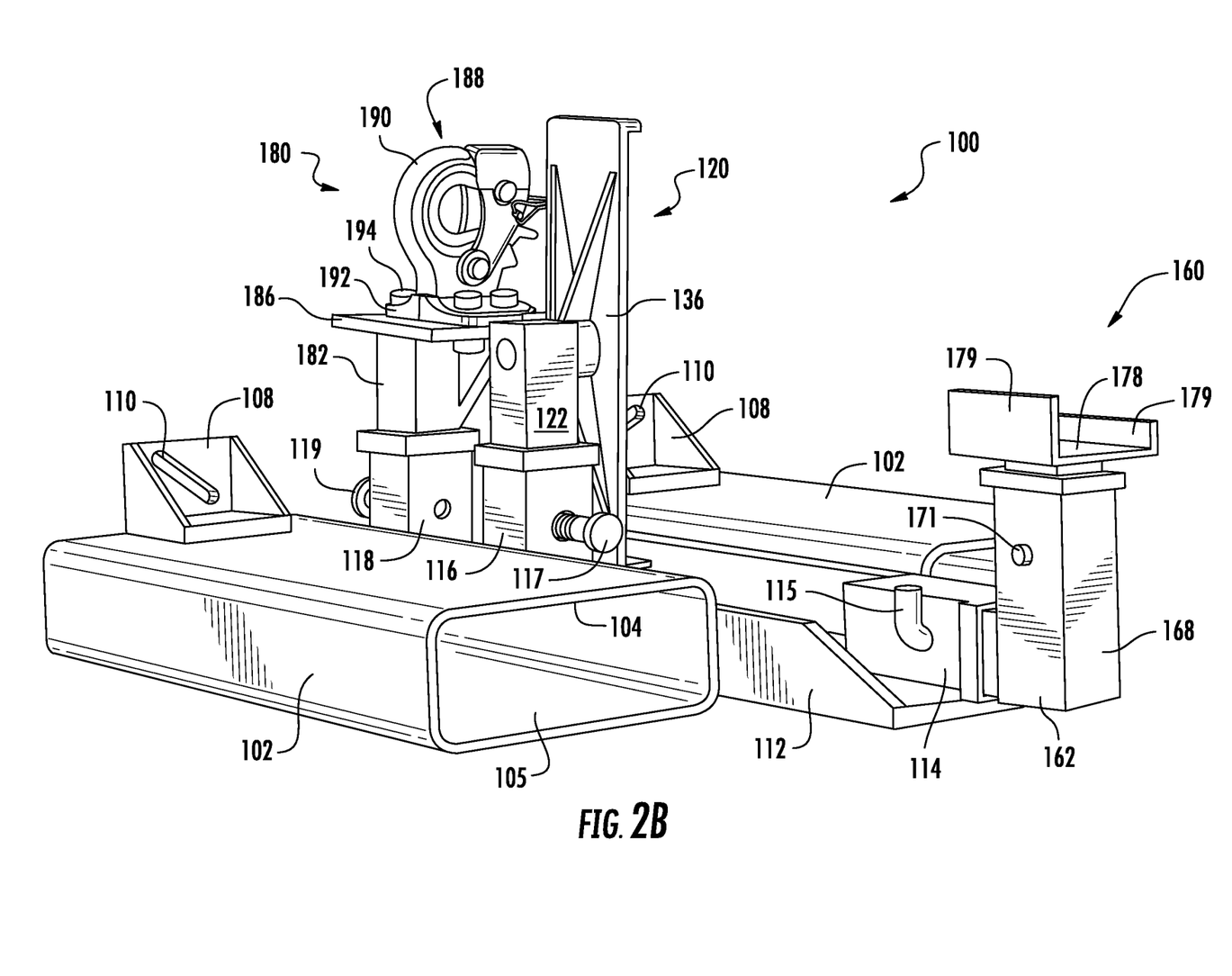
FIG. 2B is a perspective view of the mover platform of FIG. 1A with a third load support tool engaged with the receiver channel.

Now referring to FIG. 2B, the mover platform 100 is shown with the second load support tool 160 engaged in the receiver channel 114 and secured with the pin 115. FIG. 2B shows the first load support tool 120 engaged in the first storage channel 116 and the second load support tool 180 engaged in the second storage channel 118. As shown in FIG. 2B, the pivot post 172 of the second load support tool 160 sits completely within the receiver portion 168 of the L-bracket 162. By selectively aligning different holes 174 in the pivot post 172 (shown in FIG. 1E), a height position of the pivot post 172 and the second rectangular platform 178 can be adjusted relative to the receiver 114 and the mounting plate 112.

Figure 3A:
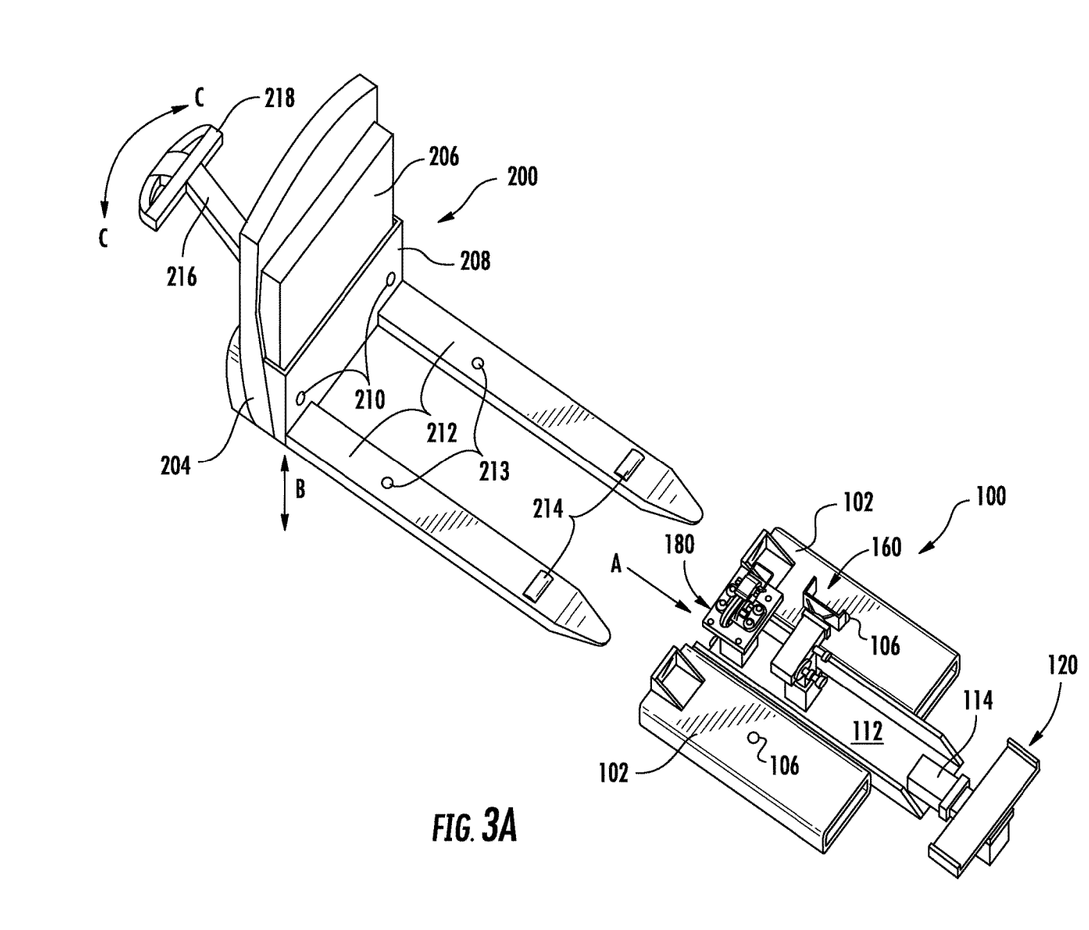
FIG. 3A is a perspective view of the mover platform of FIG. 1A aligned with a mover prior to engagement with the mover.
Figure 3B:
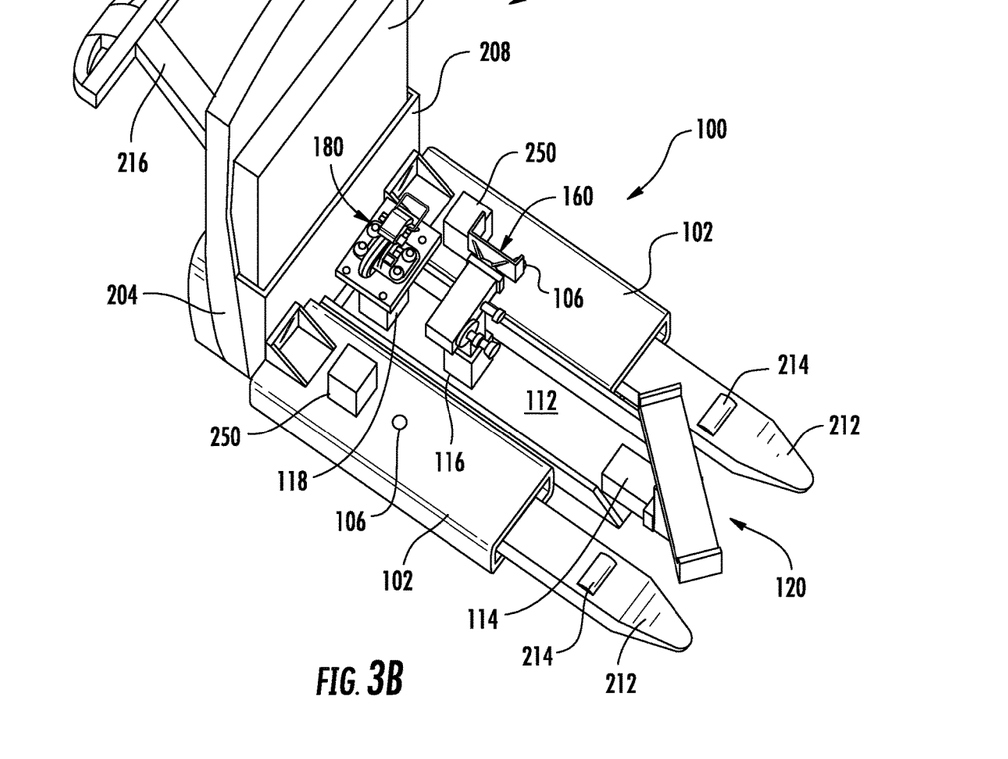
FIG. 3B is a perspective view of the mover platform of FIG. 1A engaged with the mover of FIG. 3A.

Referring now to FIGS. 3A-3B, the mover platform 100 can be engaged with a powered mover such as the pallet jack 200, a forklift, or other powered moving vehicle. The illustrated pallet jack 200 includes a chassis 204. The chassis 204 houses a battery 206 as well as an electric motor and driven wheel. The driven wheel is steerable with a handle 216 that can be turned side to side in the direction of arrows C. The motor can be controlled with a motorcycle-style rotatable grip 218 to move the pallet jack 200 in the direction of arrow A or in an opposite direction. The pallet jack 200 includes two forks 212 extending from the chassis 204. The two forks 212 can engage loads (e.g., pallets or the mover platform 100). The forks 212 could include fastener holes 213 therethrough in certain aspects. As discussed above, when the mover platform 100 is engaged with the pallet jack 200, as shown in FIG. 3B, fasteners could be inserted through the fastener holes 106 in the channels 102 and into the fastener holes 213 in the forks 212 to secure the mover platform 100 to the pallet jack 200. The chassis 204 includes a backstop plate 208 against which the loads can abut. In certain aspects, the backstop plate 208 could include fastener holes 210 therethrough. When the mover platform 100 is engaged with the pallet jack 200, as shown in FIG. 3B, fasteners could be inserted through the slots 110 in the brackets and into the fastener holes 210 in the backstop plate 208 to secure the mover platform 100 to the pallet jack 200. Ends of the two forks 212 are supported by wheels or rollers 214. At least a portion of the chassis 204 and the forks 212 can be raised or lowered in the direction of arrows B.

In use, the pallet jack 200 can be steered to a position such that the forks 212 align with the pair of channels 102 of the mover platform 100 (where in the mover platform 100 is resting on the ground), as shown in FIG. 3A. The pallet jack 200 is then moved in the direction of arrow A such that the forks 212 pass through the channels 102, as shown in FIG. 3B. After the forks 212 of the pallet jack 200 engage the channels 102 of the mover platform 100, the forks 212 can be at least partially raised such that the forks 212 contact a top interior surface 104 of the channels 102. When the forks 212 contact the top interior surface 104 of the channels 102, fastener slots 110 in the brackets 108 of the mover platform 100 may align with the fastener holes 210 in the backstop plate 208 and/or fastener holes 106 in the channels 102 of the mover plate 100 may align with fastener holes 213 in the forks 212 of the pallet jack 200. Fasteners 111 (shown in FIGS. 5-7) could be inserted through the fastener slots 110 and secured in the fastener holes 210 in the backstop plate 208 and/or fasteners 107 could be inserted through the fastener holes 106 in the channels 102 and secured in the fastener holes 213 in the forks 212 to secure the mover platform 100 to the pallet jack 200. In various aspects, the top interior surface 104 of the channels 102 could include a tractive surface, such as a rubber with a textured pattern, that increases friction between the channels 102 in the forks 212, thereby minimizing, reducing, or eliminating slipping of the channels 102 relative to the forks 212. In such aspects, the brackets 108 and the fasteners 107 and 111 could be omitted. In various aspects, the mover platform and/or the pallet jack could include a cam locking mechanism that are operable to urges the forks 212 into contact with the top interior surface 104 of the channels 102 or an opposing bottom interior surface 105 of the channels 102. For example, the cam locking mechanism could include an over-center locking cam that urges the forks 212 into contact with the top interior surface 104 of the channels 102 or the bottom interior surface 105 of the channels 102. Friction between the forks 212 and the interior surfaces of the channels 102 could hold the mover platform 100 in place on the forks 212.

FIG. 3B illustrates two weights 250 arranged on the mover platform 100 when the mover platform 100 is engaged with the pallet jack 200. Since pallet jacks are designed to lift and move loads, certain pallet jacks may be more stable when a load is applied to the forks 212. Additionally, such pallet jacks may have better traction when a load is applied. Certain applications of the mover platform 100 may result in a minimal load on the forks 212. For example, use of the third load support tool 180 with the pintle hook 188 may result in a relatively small load on the forks. The weights 250 could be optionally added to increase the load on the forks 212, thereby increasing the stability of the pallet jack 200. The weights 250 could be a plurality of small weights, such as the two weights depicted in FIG. 3B. In other aspects, the weights 250 could include three or more weights distributed about the mover platform 100 or a single weight on the mover platform 100. In various aspects, the weights 250 could be strapped to the mover platform 100 or otherwise held in place on the mover platform 100.

Figure 4:
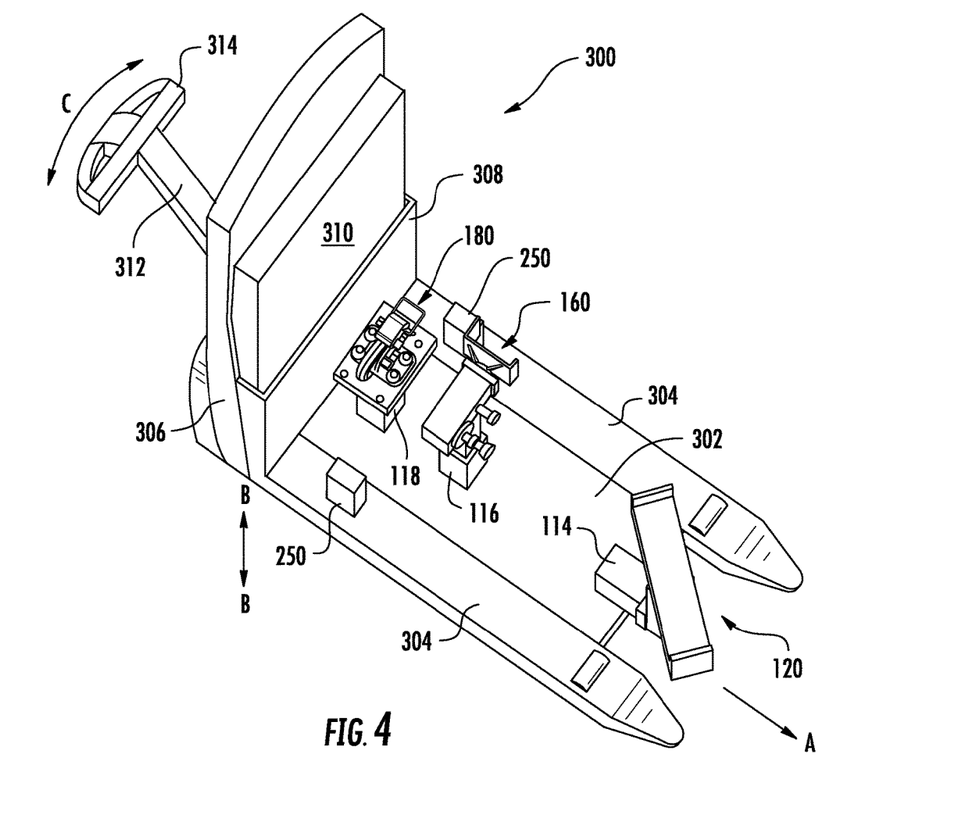
FIG. 4 is a perspective view of a mover platform integrated with a mover, according to at least one aspect.

FIG. 4 illustrates an aspect in which a mover 300 includes an integral mover platform. The mover 300 is illustrated as a pallet jack that includes a chassis 306 that carries a battery 310 as well as an electric motor and driven wheel. The driven wheel is steerable with a handle 312 that can be turned side to side in the direction of arrows C. The motor can be controlled with a motorcycle style rotatable grip 314 to move the mover 300 in the direction of arrow A or in an opposite direction. The mover 300 includes forks 304 extending from the chassis 306. A mounting plate 302 can extend from a backstop plate 308 of the chassis 306 between the forks 304. Further, the mounting plate 302 can be supported by the forks 304. For example, the mounting plate 302 could be welded to the forks 304 or fastened to the forks using bolts or similar fasteners. The receiver channel 114 and storage channels 116 and 118 can be mounted to the mounting plate 302. The load support tools 120, 160, and 180 can be interchangeably engaged with the receiver channel 114 and the storage channels 116 and 118. Weights 250 can be mounted to the forks 304 and/or the mounting plate 302 to provide stability for the pallet jack 300 in certain circumstances, as discussed above.

Figure 5:
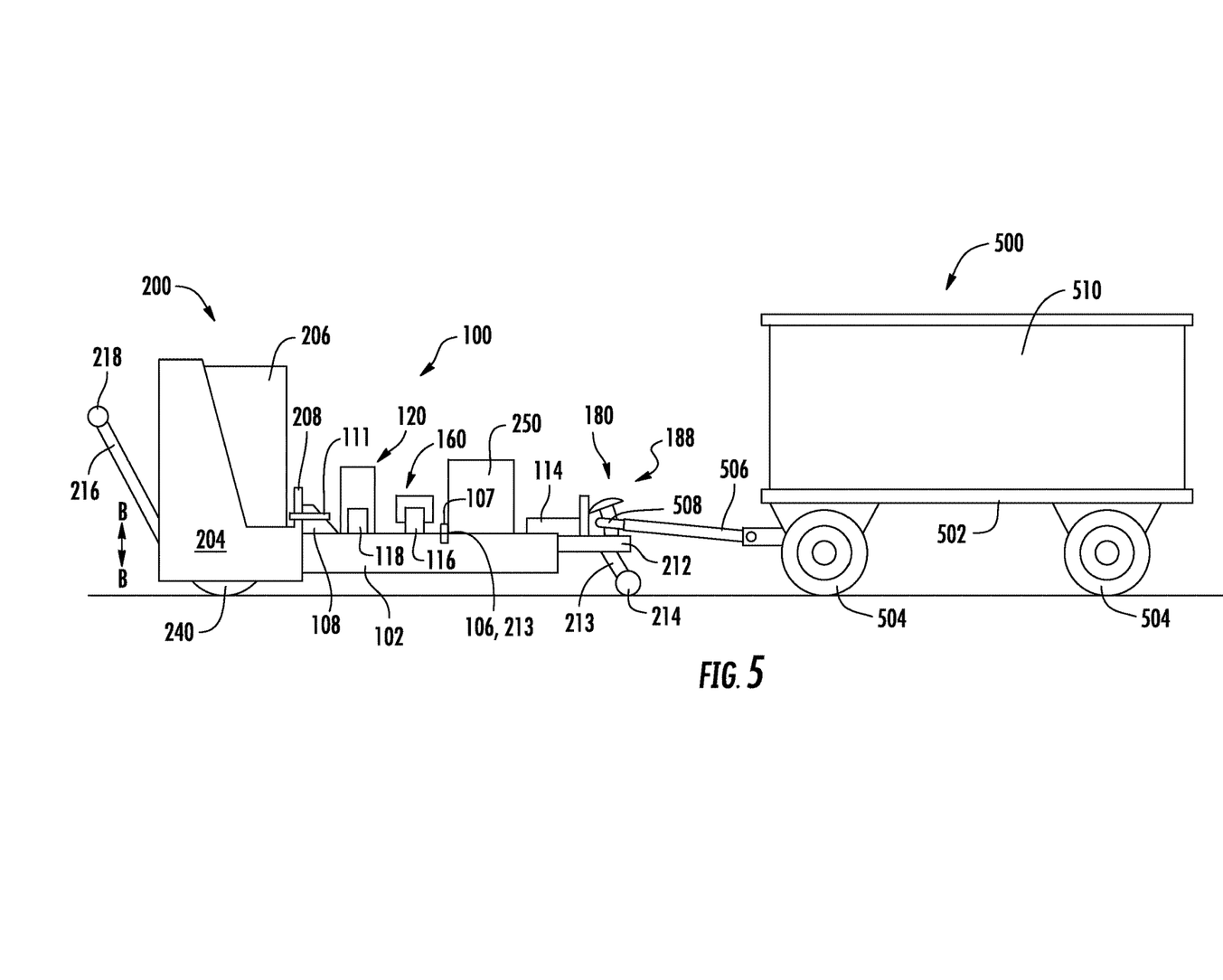
FIG. 5 is a side view of the mover platform of FIG. 1A engaged with the mover of FIG. 3A, wherein a load support tool with a pintle hitch end effector is engaged with a lunette ring of a cart, such as a ground support equipment cart.

FIG. 5 illustrates a side view of the pallet jack 200 and mover platform 100 (as shown in FIG. 3B) with the third load support tool 180 (having the pintle hitch 190 end effector) engaged with the receiver channel 114. The second load support tool 160 is engaged with the first storage receiver 116 and the first load support tool 120 is engaged with the second storage receiver 118. The chassis 204 and the forks of the pallet jack 200 are raised (in the direction of arrow B) above the ground such that the mover platform 100 is elevated off the ground. The rollers 214 of the forks extend downward on arms 213 to support ends of the forks 212. FIG. 5 illustrates fasteners 111 in the brackets 108 and the backstop plate 208 and fasteners 107 in the channels 102 in the forks 212. In various circumstances, either fasteners 111 or fasteners 107 would be used. The pallet jack 200 and mover platform 100 are engaged with a ground support equipment cart 500. Examples of ground support equipment carts 500 include, but are not limited to, 400 Hz inverter carts, movable aircraft jacks, hydraulic supply carts, and power distribution carts. The ground support equipment cart 500 includes a chassis 502 mounted on wheels 504. At least some of the wheels 504 are steerable. For example, the ground support equipment cart 500 could include a swiveled front axle attached to a tow bar 506, wherein steered wheels are attached to the front axle. As the ground support equipment cart 500 is pulled by the tow bar 506 and the pallet jack 200, the tow bar 506 urges the swiveled front axle such that the steered wheels are turned to follow the pallet jack 200 pulling. The chassis 502 includes a load 510, such as an inverter, hydraulic pump and hydraulic supply, or a battery, for example. The chassis 502 includes the tow bar 506 with a lunette ring 508 at the end. The lunette ring 508 is engaged with the pintle hook 188 of the third load support tool 180. An operator can use the handle 216 and motorcycle style grip 218 of the pallet jack 200 to move the pallet jack 200 and mover platform 100 into position next to the ground support equipment cart 500. The operator can then move the tow bar 506 to engage the lunette ring 508 with the pintle hook 188. After the ground support equipment cart 500 is connected to the mover platform 100 via the lunette ring 508 and the pintle hook 188, the operator can operate the pallet jack 200 to move and steer the ground support equipment cart 500. As discussed above, use of the pintle hook 188 to move a ground support equipment cart 500 that has a lunette ring 508 may not provide much load on the forks 212 of the pallet jack 200. In such circumstances, weights 250 can be added to the mover platform 100 to help stabilize the pallet jack 200.

Figure 6:
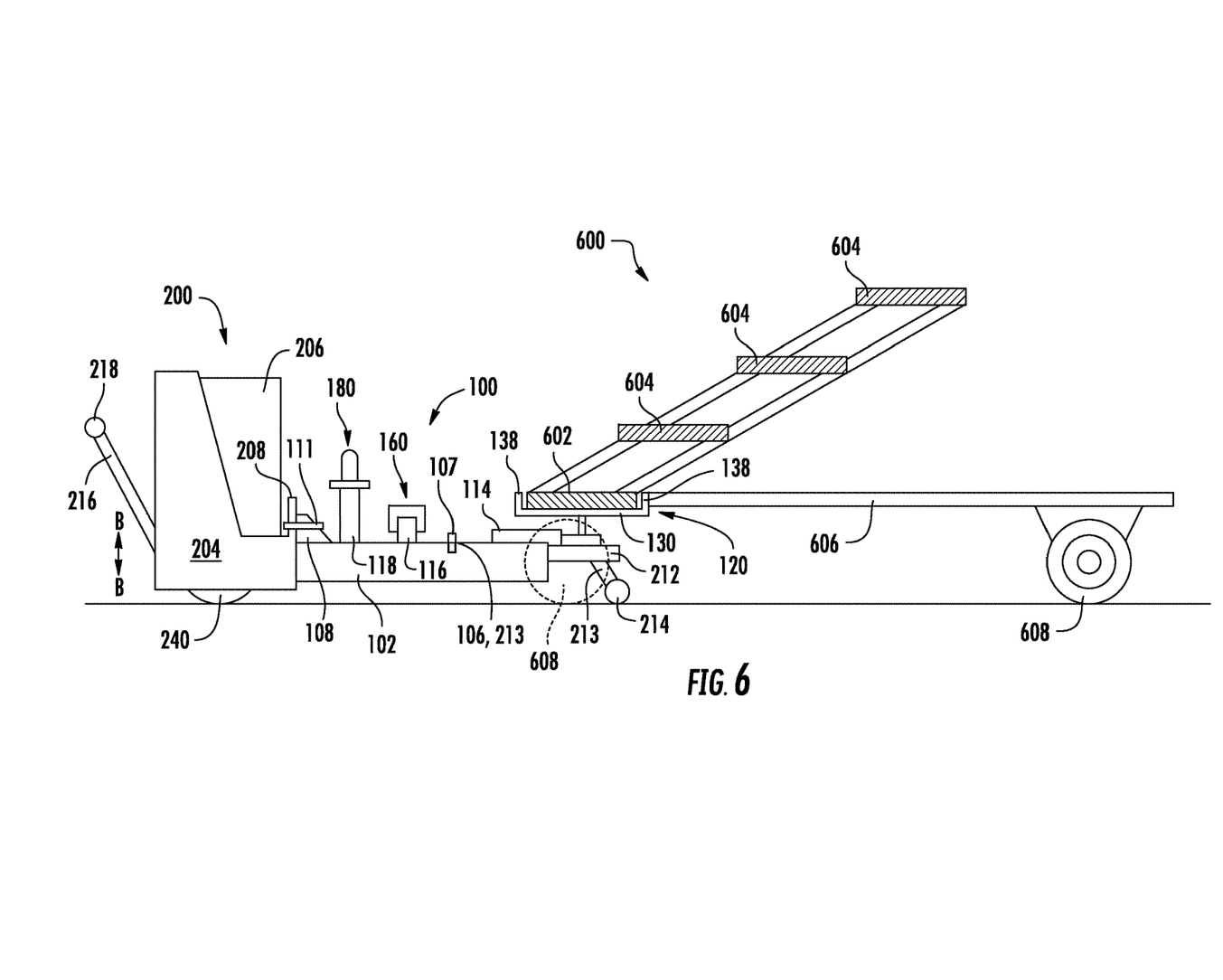
FIG. 6 is a side view of the mover platform of FIG. 1A engaged with the mover of FIG. 3A, wherein a load support tool with a 14 inch claw end effector is engaged with a bottom tread of an air stair structure.

FIG. 6 illustrates a side view of the pallet jack 200 and mover platform 100 (as shown in FIG. 3B) with the first load support tool 120 (the first rectangular platform 136) engaged with the receiver hitch 114. The second load support tool 160 is engaged with the first storage receiver 116 and the third load support tool 180 is engaged with the second storage receiver 118. The pallet jack 200 and mover platform 100 are engaged with movable air stairs 600. The air stairs 600 includes a frame 606 supported on a plurality of wheels 608. One of the wheels 608 is indicated in broken line to illustrate details of the first load support tool 120 engaging the air stairs 600. The air stairs 600 include a plurality of steps 602 and 604 that, when the movable air stairs 600 are arranged next to an aircraft, lead from the ground to an aircraft door.

The air stairs 600 are shown in a partial cross section so as to not obscure the details of the first load support tool 120 engaging the first step 602 of the air stairs 600. In use, the pallet jack 200 and mover platform 100 are maneuvered such that the rectangular platform 136 of the first load support tool 120 is under the first step 602 of the air stairs 600 with one of the vertical walls 138 extending from the rectangular platform 136 arranged in front of the first step 602 and the remaining vertical wall 138 arranged behind the first step 602. After the rectangular platform 136 is aligned with the first step 602, the pallet jack 200 and mover platform 100 are raised up in the direction of arrow B such that the rectangular platform 136 engages a bottom surface of the step 602 and at least partially lifts the front step 602. For example, in various aspects, the pallet jack 200 and mover platform 100 may lift the front step 602 such that the wheels 608 of the air stairs 600 closest to the front step 602 lift off the ground. In various other aspects, the pallet jack 200 and mover platform 100 may lift the front step 602 such that the wheels 608 remain on the ground, but a significant portion of the weight of the air stairs 600 typically carried by the wheels 608 is instead carried by the mover platform 100 and pallet jack 200. After the pallet jack 200 and mover platform 100 are raised such that the first rectangular platform 136 contacts the first step 602, an operator can use the handle 216 and the motorcycle style grip 218 to maneuver the pallet jack 200, the mover platform 100, and the air stairs 600 to position the air stairs 600 in a desired location.

Figure 7:
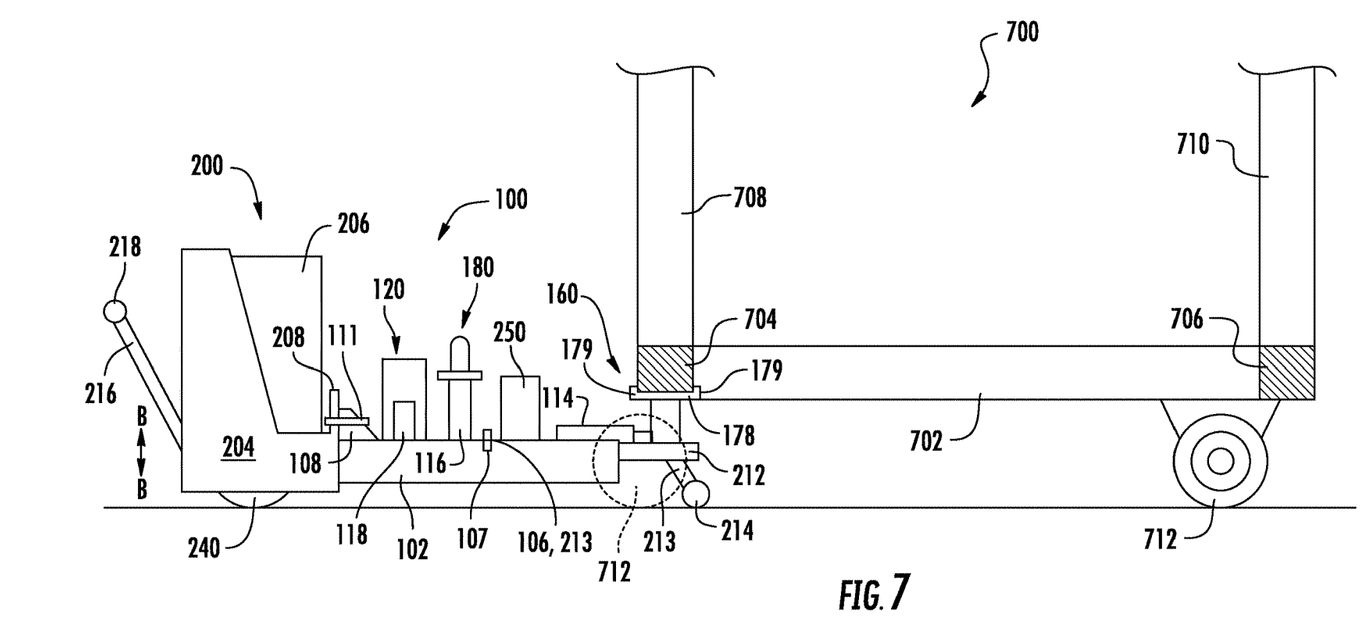
FIG. 7 is a side view of the mover platform of FIG. 1A engaged with the mover of FIG. 3A, wherein a load support tool with a 4 inch claw end effector is engaged with a frame member of a movable platform.

FIG. 7 illustrates a side view of the pallet jack 200 and mover platform 100 (as shown in FIG. 3B) with the second load support tool 160 (the second rectangular platform 178) engaged with the receiver hitch 114. The third load support tool 180 is engaged with the first storage receiver 116 and the first load support tool 120 is engaged with the second storage receiver 118. The pallet jack 200 and mover platform 100 are engaged with a movable platform 700. The platform 700 includes frame members 702, 704, and 706 supported on a plurality of wheels 712. Additional frame members 708 and 710 can support an elevated platform. The platform could be arranged next to an aircraft to allow workers to stand on the elevated platform and perform assembly and/or maintenance operations on exterior portions of the aircraft that are not reachable from the ground. One of the wheels 712 is indicated in broken line but otherwise not shown to illustrate details of the second load support tool 160 engaging the platform 700. The platform 700 is shown in a partial cross section so as to not obscure the details of the second load support tool 160 engaging the frame member 704 of the platform 700. In use, the pallet jack 200 and mover platform 100 are maneuvered such that the rectangular platform 178 of the second load support tool 160 is under the frame member 704 with one of the vertical walls 179 extending from the rectangular platform 178 arranged in front of the frame member 704 and the remaining vertical wall 179 arranged behind the frame member 704. After the rectangular platform 178 is aligned with the frame member 704, the pallet jack 200 and mover platform 100 are raised up in the direction of arrow B such that the rectangular platform 178 engages a bottom surface of the frame member 704 and at least partially lifts the frame member 704. For example, in various aspects, the pallet jack 200 and mover platform 100 may lift the frame member 704 such that the wheels 712 of the platform closest to the frame member 704 lift off the ground. In various other aspects, the pallet jack 200 and mover platform 100 may lift the frame member 704 such that the wheels 712 remain on the ground, but a significant portion of the weight of the platform 700 typically carried by the wheels 712 is instead carried by the mover platform 100 and pallet jack 200. After the pallet jack 200 and mover platform 100 are raised such that the first rectangular platform 178 contacts the frame member 704, an operator can use the handle 216 and the motorcycle style grip 218 to maneuver the pallet jack 200, the mover platform 100, and the platform 700 to position the platform in a desired location.

In the aspects described above, the first load support tool 120, the second load support tool 160, and third load support tool 180 are exemplary load support tools. In various aspects, additional load support tools that include other end effectors for engagement with other types of movable loads are contemplated.

In various circumstances, it may be advantageous to limit the speed of a powered mover, such as the pallet jack 200 discussed above. For example, it may be desirable to limit the speed at which the air stairs 600, discussed in FIG. 6, can be moved toward an aircraft to reduce the chance of bumping into an aircraft with the air stairs 600. In various aspects, the mover platform 100 could communicate with the mover (e.g., the pallet jack 200) to provide a speed limit for the mover depending on the load support tool being used. For example, the mover platform 100 could include mechanical and/or electrical sensors that detect which load support tool is engaged with the receiver channel 114. For example, if the first load support tool 120 is engaged with the receiver channel 114, such sensors could identify the first load support tool 120 and communicate such identity to a computer processor or controller for the pallet jack 200. In response, the controller of the pallet jack 200 could limit a top speed of the pallet jack 200 to a maximum safe speed for maneuvering the air stairs 600. As another example, ground support equipment, such as the ground support equipment cart 500 illustrated in FIG. 5 may never need to be placed close to an aircraft. Consequently, it may be permissible to operate the pallet jack 200 (or other mover) at its top permissible speed while moving such ground support equipment carts 500. Thus, if sensors in the mover platform 100 detect the third load support tool 180 with the pintle hook 188, the controller of the pallet jack 200 could enable the pallet jack 200 to be moved at its top speed.

In various aspects, speed control of the pallet jack 200 or other mover could be based on a proximity to an aircraft. For example, a perimeter of a work area for an aircraft could be defined by a wire below a manufacturing floor carrying a detectable radiofrequency signal. The pallet jack 200 or other mover could include a radio receiver that detects the radiofrequency signal and that is in communication with a controller for the pallet jack 200. In the event of the pallet jack 200 crosses over the wire, the radio receiver detects the radiofrequency signal. In response, the controller of the pallet jack 200 can limit a top speed of the pallet jack 200 to a maximum safe speed for maneuvering the air stairs 600 the movable platform 700, or other movable equipment. When the pallet jack 200 crosses over the wire a second time (leaving the work area for the aircraft), the radio receiver again detects the signal. In response, the controller of the pallet jack can enable the pallet check 200 to be moved at its top speed again.

In various aspects, the pallet jack 200 (or other mover) and/or the movable platform 100 could include proximity sensors. Additionally, proximity sensors could be attached to strategic locations of loads being moved by the pallet jack 200 and the movable platform 100. For example, a proximity sensor could be placed at the top of the air stairs 600 along an edge of the air stairs 600 facing an aircraft fuselage.

The proximity sensors could be in communication with a controller for the pallet jack 200. In the event that any of the proximity sensors detect a close by object e.g., an aircraft, other structures in the environment, and/or people in the environment, the controller could automatically reduce the top speed of the pallet jack 200. In instances in which the proximity sensors did detect an object within a threshold distance, the controller could automatically stop the pallet jack 200.

The descriptions of the various aspects described herein have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. An apparatus for moving a load, comprising:
   a pair of channels arranged in a spaced apart manner and arranged to receive forks of a powered mover;
   a mounting plate disposed between the channels;
   a receiver channel mounted to the mounting plate and oriented in a first direction;
   a plurality of load support tools, wherein each load support tool includes an adaptor configured to be interchangably inserted in the receiver channel, wherein each of the plurality of load support tools includes a different end effector for engaging a different load; and
   a plurality of storage receiver channels oriented in one or more second directions that are substantially perpendicular to the first direction, wherein the storage receiver channels are arranged on at least one of the pair of channels and the mounting plate, wherein the storage receiver channels are configured to store the plurality of load support tools when the load support tools are located outside of the receiver channel.

2. The apparatus of claim 1, wherein the pair of channels include at least one hole arranged to align with at least one fastener hole in the forks, and wherein the hole is adapted to receive a fastener therethrough.

3. The apparatus of claim 1, wherein an interior top surface of the pair of channels includes a tractive surface.

4. The apparatus of claim 1, wherein a first one of the plurality of load support tools includes a pintle hitch as a corresponding end effector, wherein the pintle hitch is configured to engage a lunette ring on the load.

5. The apparatus of claim 4, wherein the first one of the plurality of load support tools includes a universal plate with a plurality of pairs of height adjustment holes, wherein the pintle hitch includes a plurality of mounting holes, and wherein fasteners can be selectively applied through the mounting holes in the pintle hitch and a pair of height adjustment holes to set a height of the pintle hitch.

6. The apparatus of claim 1, wherein a first one of the plurality of load support tools includes a rectangular platform with vertical walls extending from two opposing sides of the rectangular platform, wherein the rectangular platform is configured to engage a bottom surface of a frame member of a load, and wherein the vertical walls engage side surfaces of the frame member.

7. The apparatus of claim 6, wherein the first one of the plurality of load support tools includes a pivot, wherein the rectangular platform and vertical walls can rotate about the pivot.

8. The apparatus of claim 6, wherein a second one of the plurality of load support tools includes a second rectangular platform with second vertical walls extending from two opposing sides of the second rectangular platform, wherein the sides of the second rectangular platform have different dimensions than sides of the first rectangular platform, wherein the second rectangular platform is configured to engage a bottom surface of a second frame member of a second load, and wherein the vertical walls engage side surfaces of the second frame member.

9. The apparatus of claim 8, wherein the second one of the plurality of load support tools includes a pivot, wherein the rectangular platform and vertical walls can rotate about the pivot.

10. The apparatus of claim 1,
    wherein, when the forks of the powered mover are received in the pair of channels, a first end of the pair of channels is nearer to a proximal end of the forks and a second end of the pair of channels is nearer to a distal end of the forks, and
    wherein the receiving channel is disposed at the second end of the pair of channels.

11. The apparatus of claim 1,
    wherein a longitudinal axis of the mounting plate is parallel to a longitudinal axis of the pair of channels.

12. A mover, comprising:
    a chassis;
    two load lifting forks extending in a substantially horizontal direction from the chassis, wherein each of the two load lifting forks include a wheel toward a distal end of the fork, wherein the forks can be selectively raised and lowered relative to the chassis and the wheels; and
    a mover platform, including:
       a pair of channels arranged over the load lifting forks;
       a mounting plate disposed between the channels;
       a receiver channel mounted to the mounting plate and extending in the substantially horizontal direction;
       a plurality of load support tools, wherein each load support tool includes an adaptor configured to be interchangably inserted in the receiver channel, wherein each of the plurality of load support tools includes a different end effector for engaging a different load; and
       a plurality of storage receiver channels oriented in one or more directions that are substantially perpendicular to the horizontal direction, wherein the storage receiver channels are arranged on at least one of the pair of channels and the mounting plate, wherein the storage receiver channels are configured to store the plurality of load support tools when the load support tools are located outside of the receiver channel.

13. The apparatus of claim 12, wherein an interior top surface of the pair of channels includes a tractive surface.

14. The apparatus of claim 12, wherein a first one of the plurality of load support tools includes a rectangular platform with vertical walls extending from two opposing sides of the rectangular platform, wherein the rectangular platform is configured to engage a bottom surface of a frame member of a load, and wherein the vertical walls engage side surfaces of the frame member.

15. The apparatus of claim 14, wherein the first one of the plurality of load support tools includes a pivot, wherein the rectangular platform and vertical walls can rotate about the pivot.

16. The apparatus of claim 14, wherein a second one of the plurality of load support tools includes a second rectangular platform with second vertical walls extending from two opposing sides of the second rectangular platform, wherein the sides of the second rectangular platform have different dimensions than sides of the first rectangular platform, wherein the second rectangular platform is configured to engage a bottom surface of a second frame member of a second load, and wherein the vertical walls engage side surfaces of the second frame member.

17. The apparatus of claim 12, further comprising a weight that is selectively attachable to the mover platform to stabilize two chassis and two lifting forks.

* * * * *

UNITED STATES PATENT AND TRADEMARK OFFICE
CERTIFICATE OF CORRECTION

PATENT NO. : 10,214,401 B2
APPLICATION NO. : 15/259815
DATED : February 26, 2019
INVENTOR(S) : Christian A. Brunckhorst et al.

Page 1 of 1

It is certified that error appears in the above-identified patent and that said Letters Patent is hereby corrected as shown below:

In the Claims

Column 11, Line 64, Claim 6, after "includes a" insert -- first --.

Column 11, Line 66, Claim 6, after "wherein the" insert -- first --.

Column 12, Line 32, Claim 12, delete "A mover," and insert -- An apparatus, --, therefor.

Column 12, Line 37, Claim 12, after "wherein the" insert -- two load lifting --.

Column 12, Line 41, Claim 12, after "over the" insert -- two --.

Column 13, Line 17, Claim 17, after "stabilize" delete "two" and insert -- the --, therefor.

Column 13, Line 17, Claim 17, after "and" insert -- the --.

Column 13, Line 17, Claim 17, before "lifting forks." insert -- load --.

Signed and Sealed this
Twenty-third Day of July, 2019

Andrei Iancu
*Director of the United States Patent and Trademark Office*